(12) United States Patent
Szuromi et al.

(10) Patent No.: US 10,011,892 B2
(45) Date of Patent: Jul. 3, 2018

(54) METHODS FOR PRODUCING ALLOY FORMS FROM ALLOYS CONTAINING ONE OR MORE EXTREMELY REACTIVE ELEMENTS AND FOR FABRICATING A COMPONENT THEREFROM

(71) Applicant: HONEYWELL INTERNATIONAL INC., Morristown, NJ (US)

(72) Inventors: Andy Szuromi, Phoenix, AZ (US); Brian Hann, Avondale, AZ (US); Mark C. Morris, Phoenix, AZ (US); Donald G. Godfrey, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 910 days.

(21) Appl. No.: 14/465,078

(22) Filed: Aug. 21, 2014

(65) Prior Publication Data
US 2016/0053346 A1  Feb. 25, 2016

(51) Int. Cl.
*C22C 1/02* (2006.01)
*C22C 1/03* (2006.01)
(Continued)

(52) U.S. Cl.
CPC ............... *C22C 1/02* (2013.01); *B22D 25/00* (2013.01); *B22F 1/02* (2013.01); *B22F 5/009* (2013.01);
(Continued)

(58) Field of Classification Search
CPC .......... C22C 1/02; C22C 1/023; C22C 1/026; C22C 1/03; C22C 1/06; C22C 1/04;
(Continued)

(56) References Cited

U.S. PATENT DOCUMENTS 3,575,734 A * 4/1971 Muzyka et al. ........ C22C 1/023
                                                    148/410
3,980,468 A   9/1976 Rosof et al.
(Continued)

FOREIGN PATENT DOCUMENTS

DE        3628276 A1    2/1988
WO     2014071135 A1    5/2014
WO     2014074947 A2    5/2014

OTHER PUBLICATIONS

Oleg D. Neikov, "Powders for Porous Powder Metallurgy Technology," Handbook of Non-Ferrous Metal Powders, Elsevier, pp. 212-223 (Ch. 10), 2009.*
(Continued)

*Primary Examiner* — Scott Kastler
*Assistant Examiner* — Vanessa T Luk
(74) *Attorney, Agent, or Firm* — Lorenz & Kopf, LLP (57) ABSTRACT

Methods are provided for producing alloy forms from alloys containing one or more extremely reactive elements and for fabricating a component therefrom. The fabricating method comprises substantially removing a reactive gas from the fabrication environment. An alloy form of the alloy is formed. The alloy form is formed by melting the alloy or by melting one or more base elements of the alloy to produce a molten liquid and introducing the one or more extremely reactive elements into the molten liquid. The molten alloy is shaped into the alloy form. The component is formed from the alloy form. If the one or more extremely reactive elements are introduced into the molten liquid, such introduction occurs just prior to the shaping step.

11 Claims, 4 Drawing Sheets

(51) Int. Cl.
| | |
|---|---|
| B22D 25/00 | (2006.01) |
| B22F 5/00 | (2006.01) |
| B22F 5/04 | (2006.01) |
| B22F 9/08 | (2006.01) |
| C22C 1/04 | (2006.01) |
| C22C 1/06 | (2006.01) |
| C22C 19/00 | (2006.01) |
| C22C 19/03 | (2006.01) |
| C22C 19/07 | (2006.01) |
| B22F 1/02 | (2006.01) |
| B22F 3/02 | (2006.01) |
| B22F 1/00 | (2006.01) |
| B22F 3/105 | (2006.01) |
| B22F 3/15 | (2006.01) |
| B22F 3/22 | (2006.01) |
| C22C 33/02 | (2006.01) |

(52) U.S. Cl.
CPC .............. *B22F 5/04* (2013.01); *B22F 9/08* (2013.01); *C22C 1/023* (2013.01); *C22C 1/03* (2013.01); *C22C 1/04* (2013.01); *C22C 1/0416* (2013.01); *C22C 1/0433* (2013.01); *C22C 1/0458* (2013.01); *C22C 1/06* (2013.01); *C22C 19/007* (2013.01); *C22C 19/03* (2013.01); *C22C 19/07* (2013.01); *B22F 1/0007* (2013.01); *B22F 1/0014* (2013.01); *B22F 1/0048* (2013.01); *B22F 3/02* (2013.01); *B22F 3/1055* (2013.01); *B22F 3/15* (2013.01); *B22F 3/225* (2013.01); *B22F 2999/00* (2013.01); *C22C 33/02* (2013.01); *C22C 2202/02* (2013.01); *Y02P 10/295* (2015.11)

(58) Field of Classification Search
CPC ... C22C 1/0408; C22C 1/0416; C22C 1/0425; C22C 1/0433; C22C 1/0441; C22C 1/045; C22C 1/0458; C22C 1/0466; C22C 1/0475; C22C 1/0483; C22C 1/0491; C22C 47/14; C22C 47/16
See application file for complete search history.

(56) References Cited

U.S. PATENT DOCUMENTS

| | | | |
|---|---|---|---|
| 4,244,736 A | 1/1981 | Day | |
| 4,762,553 A * | 8/1988 | Savage | ..................... B22F 9/08 219/648 |
| 4,762,558 A * | 8/1988 | German | ................ C22C 1/0433 419/23 |
| 5,021,299 A | 6/1991 | Rupp et al. | |
| 2002/0005233 A1* | 1/2002 | Schirra | .................. B22D 17/00 148/428 |
| 2013/0316183 A1 | 11/2013 | Kulkarni, Jr. et al. | |
| 2014/0010700 A1 | 1/2014 | Pandey | |

OTHER PUBLICATIONS

Povarova, K.B. et al.; Influence of Rare-Earth Metals on the High-Temperature Strength of Ni3Al-Based Alloys; ISSN 0036-0295, Russian Metallurgy (Metally), vol. 2011, No. 1, pp. 47-54. @Pleiades Publishing, ltd, 2011.
How to Use Getters and Getter Pumps; Reprinted with permission by R&D Magazine, all rights reserved. Copyright 2001. Cahners Business Information.
Guntlin, R.; State of the art, development in investment casting to face the challenges of the new generation of aero engine components; Japan Foundry Society, Inc.; 13th World Conference on Investment Casting Paper: T14; Apr. 1, 2012.
Shamblen, C.E. et al.; Superalloy Melting and Cleanliness Evaluation; Aircraft Engine Business Group General Electric Company, Ohio; Fifth International Symposium 1984.
Quested, P.N. et al.; Evaluation of Electron-Beam Cold Hearth Refining (EBCHR) of Virgin and Revert IN738LC; Superalloys 1988.
Kennedy, R.L. et al.; Superalloys made by conventional vacuum melting and a novel spray forming process; Vacuum /vol. 47/Nos. 6-8/pp. 819 to 824/1996; Copyright @ 1996 Elsevier Science Ltd.
Zhang, G. et al.; Spray Forming and Thermal Processing for High Performance Superalloys; Materials Science Forum vols. 475-479 (2005) pp. 2773-2778; @ 2005 Trans Tech Publications, Switzerland.
Walter, M. et al.; Spray Forming and Post Processing of Superalloy Rings; Superalloys 718, 625, 706 and Derivatives 2005 Edited by E.A. Loria TMS (The Minerals, Metals & Materials Society), 2005.
Bi, G. et al.; Microstructure and tensile properties of superalloy IN100 fabricated by micro-laser aided additive manufacturing; Materials and Design; vol. 60, Apr. 15, 2014.
Anam, M.A. et al.; Modeling and Experimental validation of Nickel-based super alloy (Inconel 625) made using Selective Laser Melting; Jan. 1, 2013.
Extended EP Search Report for Application No. 15180661.9-1362 dated Jan. 21, 2016.
Zhang et al.; Oxide films in laser additive manufactured Inconel 718; ScienceDirect Acta Materialia 61 (2013) 6562-6576; Available online at www.sciencedirect.com; 2013 Crown Copyright and Acta Materialia Inc. Published by Elsevier Ltd.

* cited by examiner

METHODS FOR PRODUCING ALLOY FORMS FROM ALLOYS CONTAINING ONE OR MORE EXTREMELY REACTIVE ELEMENTS AND FOR FABRICATING A COMPONENT THEREFROM

TECHNICAL FIELD

The present invention generally relates to gas turbine engine components, and more particularly relates to methods for producing alloy forms from alloys containing one or more extremely reactive elements and methods for fabricating a component therefrom.

BACKGROUND

Gas turbine engine components operating at very high temperatures typically rely on applied protective coatings such as platinum aluminde, etc. as a first line of defense against oxidation and sulfidation (i.e., hot corrosion). However, where the protective coating is worn off, eroded or otherwise breached, it is highly desirable that the exposed parent metal itself possess sufficient oxidation and/or sulfidation resistance for durability. It is known that the high-temperature oxidation resistance of various cast or wrought nickel or cobalt base superalloys can be significantly improved without metallurgical detriment, by avoiding brittle phases, for example, by retaining relatively small amounts of certain extremely reactive elements such as Lanthanum (La) or Yttrium (Y) (hereinafter "high-temperature alloys containing extremely reactive elements" or simply, "high-temperature alloys"). Depending upon the application, components made from such high-temperature alloys may possess sufficient high-temperature oxidation resistance and/or sulfidation resistance to be used bare without an applied protective coating. The high-temperature alloys are suited for long-term continuous exposure at temperatures as low as about 1300° F. and as high as about 2100° F. (1150° C.). The excellent oxidation protection and/or sulfidation protection afforded by these high-temperature alloys requires that the extremely reactive element, such as La or Y, be in the alloyed solution, and not as reaction products like oxides, carbides, nitrides, sulfides, etc. Unfortunately, these elements are extremely reactive to oxygen, carbon, nitrogen, sulfur, etc. and form such reaction products in the high-temperature alloy in which the extremely-reactive element(s) is contained, as well as in the components manufactured from the high-temperature alloy containing the one or more extremely-reactive elements. Alloys other than high-temperature alloys that include extremely reactive elements also benefit from maintaining the reactive element in alloyed form. For example, aluminum alloys having melting points starting about 1400° F. depend on La being able to freely dissolve without forming an oxide film or oxide inclusions that would interfere with that process. Therefore it is important to maintain the La in alloyed form in aluminum alloys.

Extremely reactive elements other than La and Y also provide beneficial properties if maintained in their alloyed form. For example, other extremely reactive elements in the lanthanide family of elements such as neodymium and samarium when alloyed with iron (Fe) beneficially form very strong "rare earth magnets".

Conventional fabrication techniques for components with relatively complex three-dimensional (3D) geometries include forging, casting, and/or machining. Such conventional techniques are not only expensive and have long lead-times, but may additionally have low yields. Development time and cost for certain components may also be magnified because such components generally require several iterations. Moreover, a fundamental problem existing with conventional fabrication techniques is directly related to the extreme reactivity of elements (such as La and Y) to form very strong oxides or other compounds (reaction products) as described above.

For example, with respect to the extremely reactive element lanthanum (La), current practices for retention of a minimum beneficial content of alloyed La in a wrought form or as a casting rely on adding excess amounts of the extremely reactive element(s) to molten alloy to compensate for expected losses as oxides, etc. followed by quickly solidifying the alloy to retain the alloyed form of La, taking advantage of kinetics to manage the unfavorable thermodynamics. One downside risk with adding excessive levels of La is that localized regions of the molten alloy may be less exposed to oxidizing conditions. Thus, those regions may be overly enriched in La, possibly resulting in embrittlement or other metallurgical defects in the component. At the very least, significant variability in the concentration of alloyed La in the molten alloy may occur, depending on stirring, diffusion, reaction, etc. Because of the segregation of La in the alloyed form and the variability in formation of oxides, conventional methods of sampling to verify chemical composition may not be a sufficiently reliable indicator or predictor of having a desired controlled amount or level of alloyed La present where it is needed. Additive-manufactured components of high-temperature alloys containing the extremely reactive element La also fail to consistently achieve the optimal level of oxidation protection and/or sulfidation protection due to the depletion or chemical loss of a significant portion of the beneficial alloyed La to detrimental oxides. Similar issues exist with the other extremely reactive elements (i.e., those elements extremely reactive to forming oxides, carbides, nitrides, sulfides, etc. or other compounds based on thermodynamics as illustrated by Ellingham diagrams).

Hence, there is a need for methods for producing alloy forms from alloys containing one or more extremely reactive elements and methods for fabricating a component therefrom. Such methods enable the one or more extremely reactive elements in the alloy to be maintained in the beneficial alloyed (metallic) form at a controlled useful level, thereby conferring beneficial properties (e.g., oxidation-resistance, sulfidation-resistance and/or unique magnetic properties (at ambient temperature)) to the fabricated component. Furthermore, other desirable features and characteristics of the present invention will become apparent from the subsequent detailed description of the invention and the appended claims, taken in conjunction with the accompanying drawings and this background of the invention.

BRIEF SUMMARY

Methods are provided for fabricating a component, in a fabrication environment, from an alloy containing one or more extremely reactive elements. In accordance with one exemplary embodiment, the method comprises substantially removing a reactive gas from the fabrication environment. An alloy form of the alloy is formed. The alloy form is formed by melting the alloy or by melting one or more base elements of the alloy to produce a molten liquid and introducing the one or more extremely reactive elements into the molten liquid. The molten alloy is shaped into the alloy form. The component is formed from the alloy form. If the one or more extremely reactive elements are introduced into the molten liquid, such introduction occurs just prior to the shaping step.

Methods are provided for forming, in a fabrication environment, a metal powder comprising an alloy containing one or more extremely reactive elements in accordance with yet another exemplary embodiment of the present invention. The method comprises substantially removing a reactive gas from the fabrication environment. A molten alloy is formed by melting the alloy or by melting a base element of the alloy to produce a molten liquid and introducing the one or more extremely reactive elements into the molten liquid. The molten alloy is atomized into the metal powder comprising particles having at least one of a selected size distribution, size, or shape. The metal powder is formed in a reducing atmosphere or in a vacuum atmosphere using a reducing gas. The metal powder is to be used in a subsequent powder consolidation process.

Furthermore, other desirable features and characteristics of the methods will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 2A:
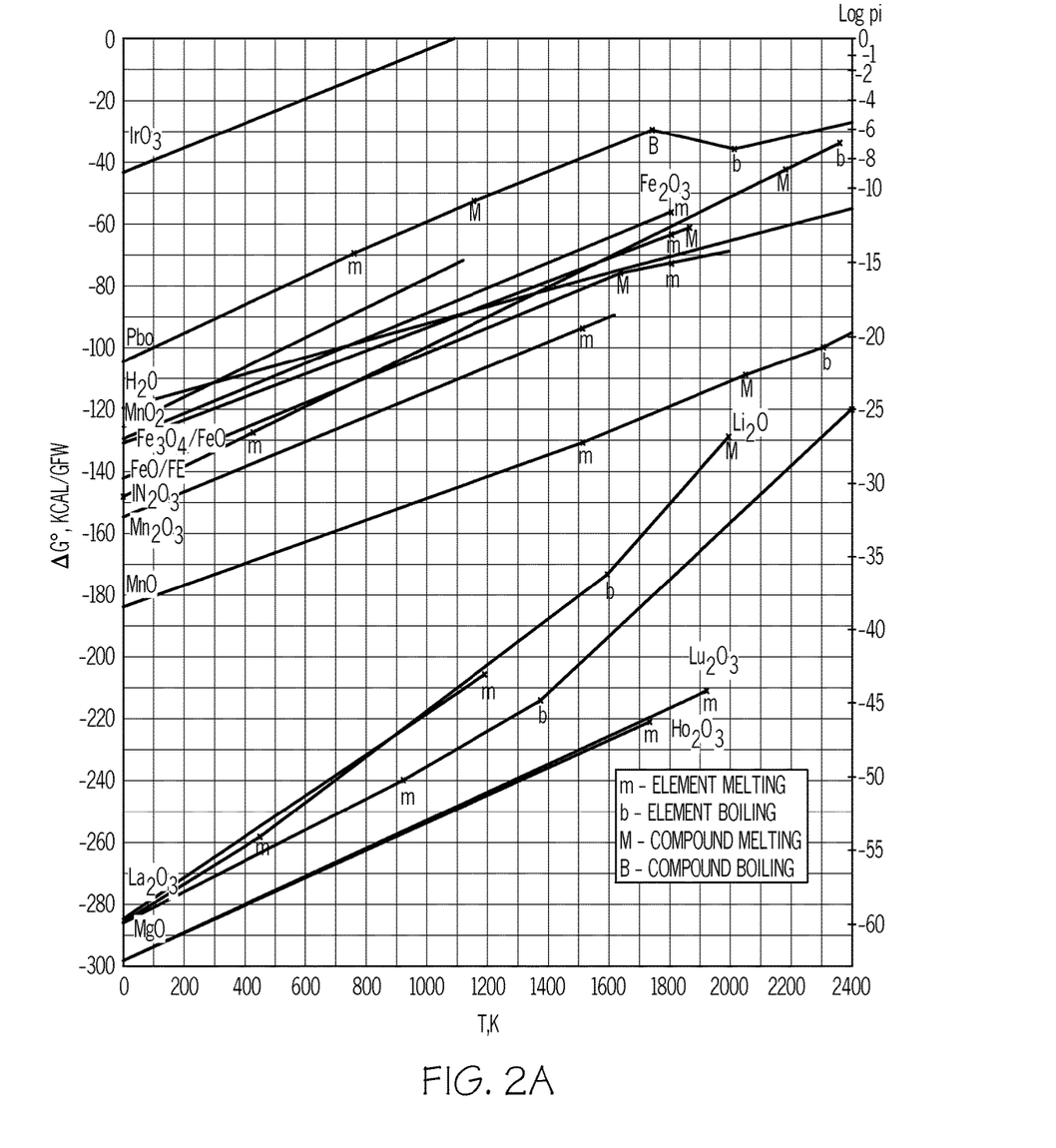
FIGS. 2A and 2B illustrate, respectively, an Ellingham diagram for lanthanum reacting to form the oxide, La2O3 and an Ellingham diagram for yttrium reacting to form the oxide, Y2O3 (reproduced from Howard, Stanley M. entitled "Ellingham Diagrams")
Figure 2B:
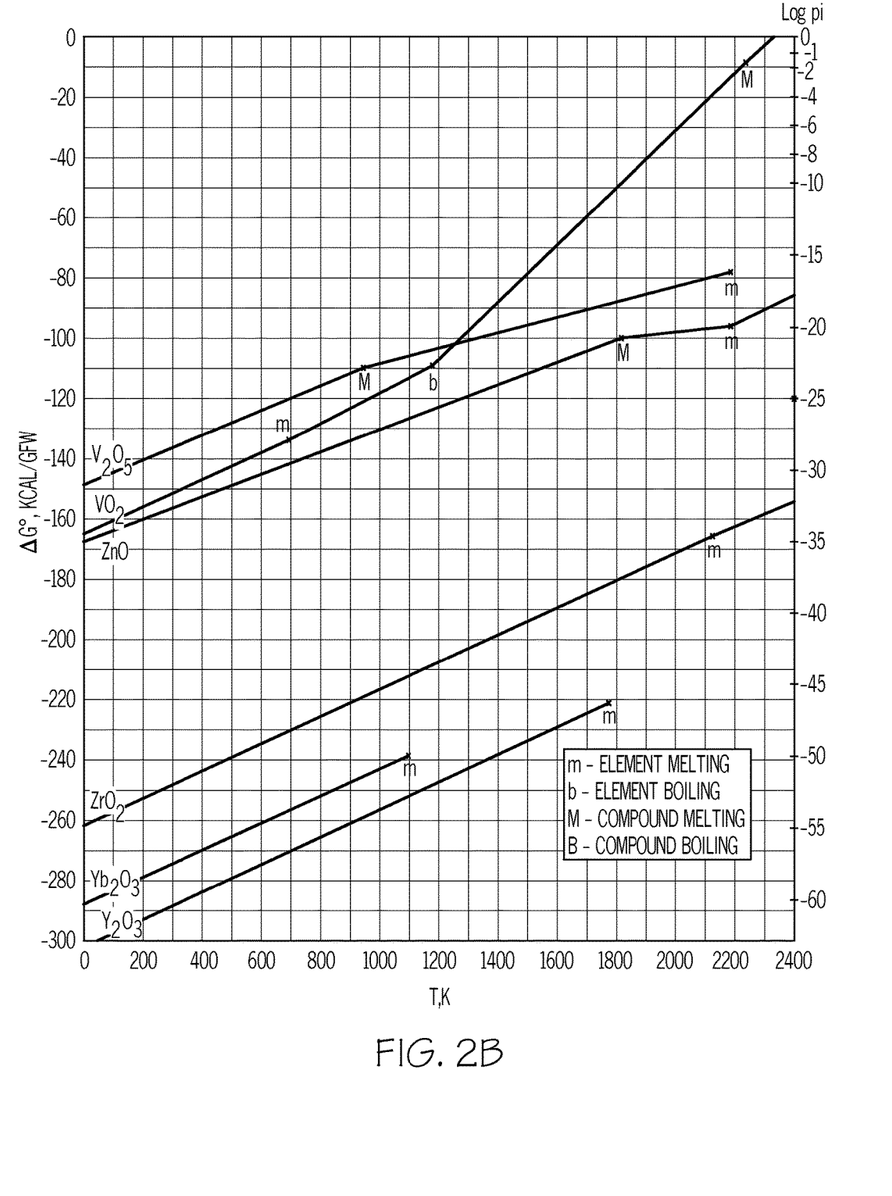

Various embodiments are directed to methods for forming an alloy form from an alloy containing an extremely reactive element and methods for fabricating a component therefrom. As used herein, the term "alloy form" refers to an ingot, a billet, a metal powder, or the like. The term "alloy" refers to a metal made by combining two or more metallic elements, with at least one of the metallic elements being an extremely reactive element and at least one of the other metallic elements being a "base element". The term "alloy" includes "high-temperature alloys" suited for long-term continuous exposure at temperatures as low as about 1300° F. and as high as about 2100° F. (1150° C.). Exemplary high-temperature alloys include, but are not limited to, nickel (Ni)-based and cobalt (Co)-based alloys and superalloys. In this instance, nickel and cobalt are the "base elements" for the respective alloy. Other alloys based on titanium, iron, aluminum, etc. ("base elements") containing one or more extremely reactive elements will also benefit from the methods according to exemplary embodiments. As used herein, the term "extremely reactive element" refers to elements such as Lanthanum (La), Yttrium (Y), neodymium (Nd), samarium (Sm), and others (based on thermodynamics as illustrated by Ellingham diagrams (e.g., FIGS. 2A and B)) that are extremely reactive to oxygen (forming oxides), nitrogen (forming nitrides), carbon (forming carbides), etc. On Ellingham diagrams, the term "extremely reactive" means forming compounds such as oxides, nitrides, etc. with very large negative free energy values. The more negative the free energy, the more reactive and stable the oxide. The term "extremely reactive" is temperature-dependent wherein oxidation becomes a greater issue when extremely reactive elements are added to alloys with melting points over 2400° F. However, as noted previously, even for aluminum alloys, etc. that have a melting point less than 2400° F., precautions are needed to maintain the extremely reactive element in alloyed form with aluminum, thereby preventing an oxide film or oxide inclusions from forming. The alloy containing the one or more extremely reactive elements may have superior oxidation- and/or sulfidation resistance (i.e., hot corrosion) in high temperatures, unique magnetic properties, and/or other beneficial properties if the extremely reactive element remains in the alloyed form, rather than reacting with oxygen or other elements to form compounds (such as oxides, nitrides, or carbides). The methods according to exemplary embodiments improve alloying and distribution of the one or more extremely reactive elements throughout the fabricated component. The ability to maintain the extremely reactive element in the alloyed form (e.g., not as an oxide, etc.) and at a controlled useful level is important for producing a high quality alloy form comprising the alloy containing the one or more extremely reactive elements as hereinafter described, and ultimately the component to be fabricated, as hereinafter described. While component fabrication from alloy forms of alloys containing extremely reactive elements has been described, it is to be understood that alloys containing common reactive elements such as aluminum, titanium, hafnium and zirconium may also benefit from the methods according to exemplary embodiments by behaving more as alloying elements and less as deoxidizers.

The methods according to exemplary embodiments as described herein may be used for fabricating gas turbine engine components, such as components for the combustor section of the gas turbine engine (e.g., combustor liners, combustor supports, combustor swirlers and fuel nozzles), turbine shrouds, afterburners, etc. While the fabrication of gas turbine engine components has been described, it is to be understood that components used in other products and in other industries may be fabricated according to exemplary embodiments as described herein. For example, alloy forms of alloys containing one or more extremely reactive elements and the components fabricated therefrom in accordance with exemplary embodiments of the present invention may be used in the petrochemical industry, in processes using high-temperature furnaces, etc.

Figure 1:
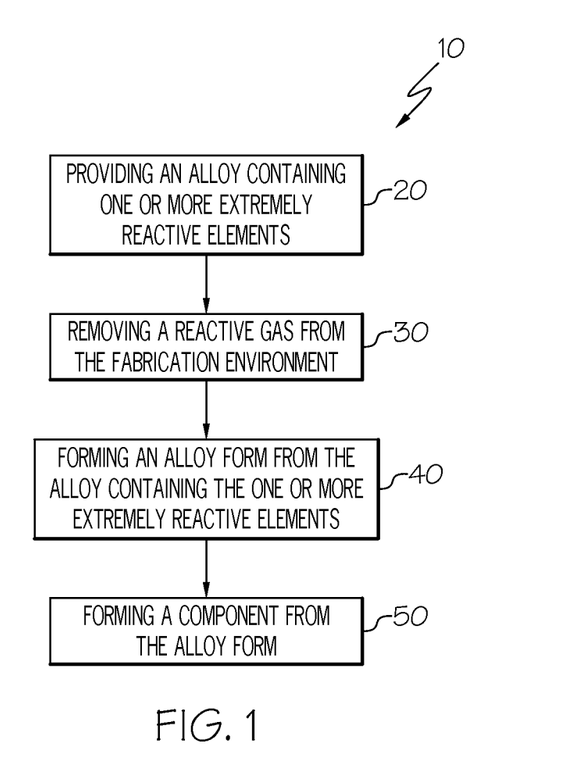
FIG. 1 is a flow diagram of a method for forming an alloy form from an alloy containing one or more extremely reactive elements and a method for fabricating a component therefrom, according to exemplary embodiments of the present invention.

Referring now to FIG. 1, in accordance with exemplary embodiments, a method 10 for fabricating a component from an alloy containing one or more extremely reactive elements begins by providing the alloy (step 20). In one embodiment, the alloy may be commercially available and thus obtained from commercial sources. Examples of suitable commercially available high-temperature alloys that contain elements extremely reactive to forming oxides include HAYNES® 230® Ni-base superalloy. The chemical composition of HAYNES® 230® Ni-base superalloy includes 0.005 to 0.05% La, oxidation resistant to 2100° F., HAYNES® 214® Ni-base superalloy with about 0.01% Y, oxidation resistant to 2300° F., and HAYNES® 188 Co-base superalloy containing 0.02 to 0.12% La. Alternatively, the alloy may be synthesized according to known methods.

As noted previously, alloys other than high-temperature alloys that contain one or more extremely reactive elements may also benefit from the methods according to exemplary embodiments of the present invention. Such alloys include those based on base elements such as titanium, iron, aluminum, etc. For example, aluminum alloys having melting points starting about 1400° F. depend on La being able to freely dissolve without forming an oxide film or oxide inclusions that would interfere with that process. Therefore it is important to maintain the La in alloyed form in aluminum alloys. Iron alloys containing extremely reactive elements in the lanthanide family of elements such as neodymium and samarium in alloyed form beneficially form very strong rare earth magnets.

Changing the base element does not change the technical approach needed to retain a controlled effective amount of the one or more extremely reactive elements in the alloyed form. For example, Ni-, Fe-, and Co-based alloys all have melting points above 2300° F. where the extremely reactive elements (e.g., La) based on thermodynamics alone could be considered significantly kinetically-driven by those necessary high temperatures speeding up chemical reactivity if exposed to any source of oxygen including oxides of other elements. The alloys used to form rare earth magnets as previously described are used at ambient temperatures, not needing oxidation- or sulfidation-resistance. The alloy may be produced in different alloy forms, such as in the form of an ingot, billet, powder, etc. as hereinafter described.

Still referring to FIG. 1, according to exemplary embodiments, the method 10 for fabricating a component from an alloy containing one or more extremely-reactive elements continues by substantially removing reactive gas from the fabrication environment (step 30). The term "reactive gas" as used herein refers to gas that contains elements with which the one or more extremely reactive elements may react to form undesirable compounds (e.g., oxides, nitrides, carbides, etc.). Exemplary reactive gas comprises or contains air, carbon dioxide, methane, ammonia, water vapor, nitrogen, oxygen, etc. and combinations thereof. The reactive gas can be present as contamination from cleaning solutions, formed by high voltage discharges (lasers, electron beams, etc.), etc. The reactive gas that may be present in the fabrication environment is removed at the beginning of and throughout fabrication of the component according to exemplary embodiments of the present invention as described herein, to substantially prevent the reactive gas from forming undesirable compounds with the one or more extremely reactive elements. The term "fabrication environment" as used herein refers to the environment(s) in which the alloy form and the component are formed (steps 40 and 50, respectively), as hereinafter described. According to exemplary embodiments, one or more chemical getters may be used to remove harmful residual levels of reactive gas from the fabrication environment. Candidate getters may be determined from known Ellingham diagrams and may include calcium, magnesium, carbon, hydrogen, methane, and others. FIG. 2A is an Ellingham diagram for selected oxides, including the metal element La reacting to form the oxide, $La_2O_3$. FIG. 2B is an Ellingham diagram for selected oxides, including the metal element Y reacting to form the oxide, $Y_2O_3$. Similar Ellingham diagrams can also be drawn for other extremely reactive elements, other oxides, and other than oxides (e.g., metals reacting with sulfur, chlorine, etc., but the oxide form of the diagram is most common). For the removal of oxygen from the fabrication environment, the selected chemical getter should have a higher affinity for oxygen than does the extremely reactive element in the alloy to be used, as determined from the relevant Ellingham diagram. Other measures to substantially remove reactive gas in the fabrication environment include using a reducing atmosphere (e.g. ~3% hydrogen mixture within an argon or argon/helium cover gas), a reducing partial pressure of reducing gas such as hydrogen or methane (e.g. ~200 microns) for vacuum atmospheres. While the use of chemical getters for removing reactive gas from the fabrication environment has been described, it is to be understood that conventional techniques such as the purging of the fabrication chamber(s) and the introduction of an inert gas or hard vacuum may also be performed. Argon and helium are common inert gases that do not react with the extremely reactive elements La, Y, etc.

Referring again to FIG. 1, in accordance with exemplary embodiments, the method 10 for fabricating a component from an alloy containing one or more extremely reactive elements continues by forming an alloy form from the alloy (step 40). As noted previoiusly, the alloy form may be an ingot, a billet, a metal powder, and other known alloy forms. The step of forming the alloy form comprises producing a molten alloy and thereafter shaping the molten alloy.

In an embodiment, the alloy may be melted in a ceramic crucible (a melting vessel) to form the molten alloy. As the extremely reactive element can react with the oxides of the ceramic material of the crucible, undesirably depleting or removing the beneficial alloyed form of the extremely reactive element contained in the alloy, it is necessary to minimize this reaction. According to exemplary embodiments, the ceramic crucible may be coated with a thermodynamically stable oxide to provide a protective barrier against the one or more extremely reactive elements, i.e., to produce reduced chemical reactivity. For example, a ceramic crucible may be coated with $La_2O_3$ (lanthana), $Y_2O_3$ (yttria), etc. providing a protective barrier against the one or more extremely reactive elements (e.g., La) contained in the alloy reducing the oxides (typically MgO, alumina, zirconia, etc.) of the ceramic crucible.

In an alternative embodiment, the alloy may be melted using melting techniques such as Electron Beam Cold Hearth Refining (EBCHR), induction skull melting, etc. wherein the crucible is comprised of essentially the solidified form of the alloy, thereby eliminating the ceramic crucible as a source of oxidation during melting of the alloy. Having the melt vessel be essentially the same alloy as that being melted is known in the art for avoiding reaction issues with ceramic crucibles.

In an alternative embodiment, the molten alloy may be produced by introducing the one or more extremely reactive elements to a molten liquid comprising the one or more base elements of the alloy, just prior to shaping the molten alloy into the alloy form as hereinafter described, thereby minimizing the exposure time to the refractory (and subsequent oxidation of the metal).

In yet another exemplary embodiment, the extremely reactive element may be "pre-diluted" or "pre-alloyed" to lower the concentration (and thus the reactivity) of the one or more extremely reactive elements in the molten alloy. For example, by pre-alloying the extremely reactive element La with, for example, nickel, cobalt, or both (e.g. nickel lanthanum or cobalt lanthanum), the concentration of La may be lowered, thereby reducing its reactivity. A nickel lanthanum master alloy, for example, may be used to make the alloy containing the lanthanum. One means of introducing the nickel lanthanum master alloy (e.g., a 85% Ni-15% La master alloy) is by atomizing and consolidating via additive manufacturing to form a sacrificial metal foam, through which the alloy may be poured, reside in a tundish (in order to homogenize), and subsequently atomized to introduce the one or more extremely reactive elements in a precisely controlled manner and amount.

In another example of pre-alloying, aluminum alloys containing La having melting points starting about 1100° F. depend on the La being able to freely dissolve without forming an oxide film or oxide inclusion that would interfere with that process. A master aluminum alloy (e.g., 95% aluminum and 5% lanthanum) at a temperature above the melting point of pure lanthanum (the melting point of pure lanthanum is about 1700° F.) may be used to speed up the dissolution in aluminum that melts at about 1200° F. Then small amounts of the La-bearing master aluminum alloy could be added to an aluminum alloy at a colder temperature.

As noted previously, the step of forming the alloy form further comprises shaping the molten alloy into the alloy form. The shaping of the molten alloy into alloy forms may be performed as known to one skilled in the art. For example, the molten alloy may be shaped into the alloy form such as an ingot by pouring the molten alloy into a mold. The molten alloy may be shaped into a metal powder by an atomizing nozzle, or the like. Metal powder is formed from the alloy by gas atomization according to conventional processes as known to one skilled in the art. The metal powder formed in step 40 comprises a substantially oxygen-free metal powder. In accordance with exemplary embodiments, the step of forming a powder comprises forming the metal powder having particles of a selected size distribution, size, and shape that resist oxidation. For example, the amount of fine particles (<20 microns) may be limited as the fine particles inherently contain more absorbed oxygen/moisture due to high surface area per unit volume. Tight control of the particle size distribution also helps ensure good flowability. The use of spherical or near spherical-shaped particles also minimizes the surface area exposed to oxidation. A thin flux-type coating may be applied to the powder to facilitate fusion of powder particles. The coating may include melting point depressant elements such as boron, silicon, carbon, etc. The metal powder formed from the alloy comprises a powder build material to be used as the starting material in the additive manufacturing (AM) fabrication process and other powder consolidation processes as hereinafter described. Thus, powder characteristics of the metal powder used as the powder build material (build material 1070 in FIG. 3) for additive manufacturing (3D printing, rapid prototyping) and other powder consolidation processes are characterized by a spherical or near-spherical morphology and high packing density, conferring good flow properties. The metal powder may be treated using hydrogen, methane or other reducing gas to reduce oxides. Oxygen in the form of exposed oxides can be removed by the strong reducing gas hydrogen in the form of water vapor before it has a chance to re-react with the powder. Such treatment can be performed in a fluidized bed or similar process, as known to one skilled in the art. Substantially oxygen-free metal powders comprising the alloy containing one or more extremely reactive elements result in clean microstructures and low inclusion levels in the component fabricated therefrom.

Referring again to FIG. 1, according to exemplary embodiments of the present invention, the method 10 for fabricating a component from the alloy containing one or more extremely reactive elements continues by forming the component from the alloy form (step 50). For example, the metal powder (the build material 1070 in FIG. 3) formed in step 40 may be used to form the component using a powder consolidation process. The component may be formed using additive manufacturing fabrication techniques such as by a Direct Metal Laser Fusion (DMLF) system, shown in FIG. 3, by Direct Metal Electron Beam Fusion (DMEBF), or by other powder consolidation techniques as hereinafter described. Such techniques are well known to those skilled in the art. Additive manufacturing (AM) fabrication techniques (including those which form "cores" for subsequent conventional casting) as well as other powder consolidation processes such as press and sinter, powder forge, near-net shape hot-isostatic pressing, and metal injection molding (MIM), etc. have been developed to fabricate components having relatively complex three dimensional geometries, including components with internal surfaces defining internal passages including internal hollow areas, internal channels, internal openings or the like (collectively referred to as "internal passages") for cooling, weight reduction, or otherwise. As used herein, the term "powder consolidation process" refers to a process used to transform loose powder (such as a powder build material) into a solid shape. The powder build material is densified by fusing adjacent powder particles. The term "subtractive manufacturing powder consolidation process" refers to hot-isostatic pressing, extrusion, extrusion and subsequent forging, and other processes where subsequent material removal by, for example, machining to achieve tight dimensional control may be used.

Additive Manufacturing (AM) is specifically defined by the American Society for Testing and Materials (ASTM) as the "process of joining materials to make objects from 3D model data, usually layer upon layer, as opposed to subtractive manufacturing methodologies, such as traditional machining and casting." Some examples of additive manufacturing processes include: direct metal laser sintering (DMLS) technology; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition.

AM fabrication may begin with providing a model, such as a design model, of the component. The model may be defined in any suitable manner. For example, the model may be designed with computer aided design (CAD) software and may include three-dimensional ("3D") numeric coordinates of the entire configuration including both external and internal surfaces. In one exemplary embodiment, the model may include a number of successive two-dimensional ("2D") cross-sectional slices that together form the 3D component.

The component is formed according to the model, using a rapid prototyping or additive layer manufacturing process. In one particular exemplary embodiment, direct metal laser fusion (DMLF) may be used to manufacture the component. DMLF is a commercially available laser-based rapid prototyping and tooling process by which complex parts may be directly produced by precision melting (hereinafter "AM fusion melting") and solidification of metal powder into successive layers of larger structures, each layer corresponding to a cross-sectional layer of the 3D component. DMLF may include direct metal laser sintering (DMLS).

Figure 3:
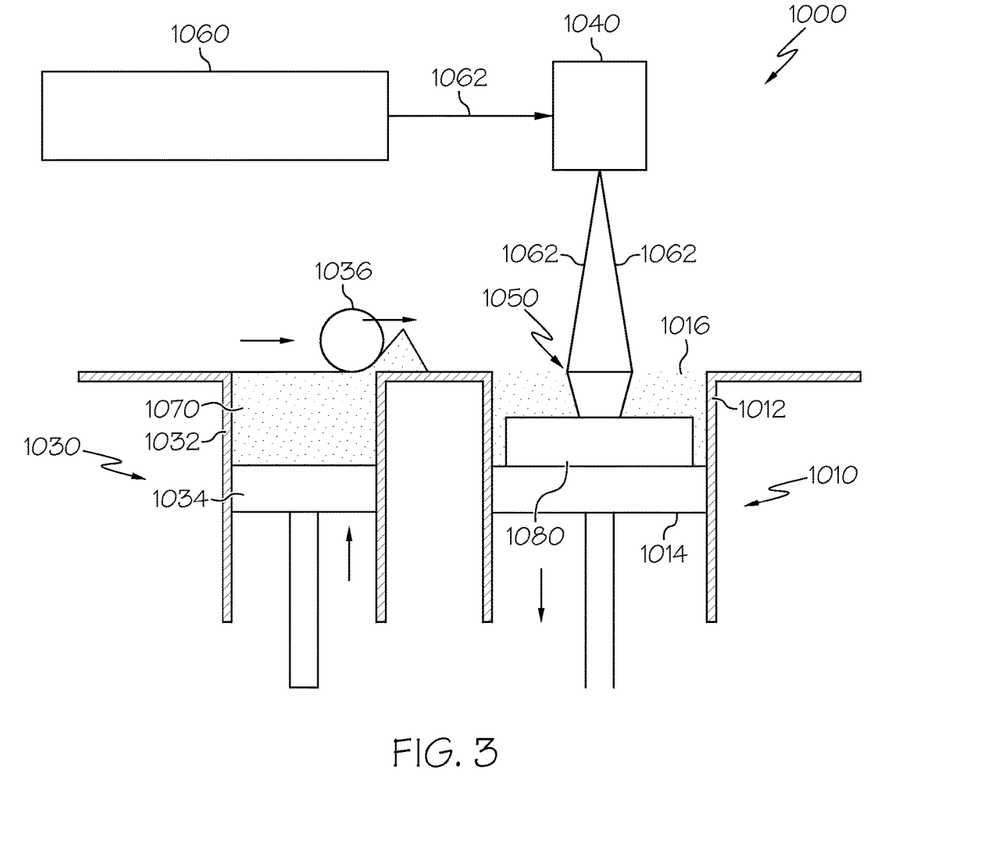
FIG. 3 illustrates an exemplary additive manufacturing system suitable for use in fabricating a component from a metal powder comprising an alloy containing one or more extremely reactive elements in accordance with the present disclosure.

FIG. 3 is a schematic view of an exemplary DMLF system 1000 for fabricating the component from the alloy containing one or more extremely reactive elements, in accordance with an exemplary embodiment. The system 1000 includes a fabrication device 1010, a powder delivery device 1030, a scanner 1040, and a laser 1060 that function to fabricate the component 1050 with build material 1070. The fabrication device 1010 includes a build container 1012 with a fabrication support 1014 on which the article 1050 is formed and supported. The fabrication support 1014 is movable within the build container 1012 in a vertical direction and is adjusted in such a way to define a working plane 1016. The delivery device 1030 includes a powder chamber 1032 with a delivery support 1034 that supports the build material 1070 and is also movable in the vertical direction. The delivery device 1030 further includes a roller or wiper 1036 that transfers build material 1070 from the delivery device 1030 to the fabrication device 1010.

During operation, a base block 1080 may be installed on the fabrication support 1014. The fabrication support 1014 is lowered and the delivery support 1034 is raised. The roller or wiper 1036 scrapes or otherwise pushes a portion of the build material 1070 from the delivery device 1030 to form the working plane 1016 in the fabrication device 1010. The laser 1060 emits a laser beam 1062, which is directed by the scanner 1040 onto the build material 1070 in the working plane 1016 to selectively fuse the build material 1070 into a cross-sectional layer of the article 1050 according to the design. More specifically, the speed, position, and other operating parameters of the laser beam 1062 are controlled to selectively fuse the powder of the build material 1070 into larger structures by rapidly melting the powder particles that may melt or diffuse into the solid structure below, and subsequently, cool and re-solidify. As such, based on the control of the laser beam 1062, each layer of build material 1070 may include unfused and fused build material 1070 that respectively corresponds to the cross-sectional passages and walls that form the component 1050. In general, the laser beam 1062 is relatively low power to selectively fuse the individual layer of build material 1070. As an example, the laser beam 1062 may have a power of approximately 50 to 500 Watts, although any suitable power may be provided.

According to exemplary embodiments of the present invention, substantially full homogenization of the one or more extremely reactive elements in the AM layers upon rapid solidification will improve oxidation resistance and/or sulfidation resistance of the fabricated component by healing possible micro-gaps in levels of the extremely reactive element, i.e., the extremely reactive element(s) may be concentrated or depleted in various areas within the layers. By slowly heating the layer to a temperature triggering diffusion, the gradients can be reduced by homogenization to a tolerable level for the application. Homogenization of the one or more extremely reactive elements in the weld deposits formed during other fabrication techniques helps to distribute the beneficial alloyed element in the fabricated component.

Upon completion of each layer, the fabrication support 1014 is lowered and the delivery support 1034 is raised. Typically, the fabrication support 1014, and thus the component 1050 (more particularly, the in-process component to be formed), does not move in a horizontal plane during this step. The roller or wiper 1036 again pushes a portion of the build material 1070 from the delivery device 1030 to form an additional layer of build material 1070 on the working plane 1016 of the fabrication device 1010. The laser beam 1062 is movably supported relative to the component 1050 and is again controlled to selectively form another cross-sectional layer. As such, the component 1050 is positioned in a bed of build material 1070 as the successive layers are formed such that the unfused and fused material supports subsequent layers. This process is continued according to the modeled design as successive cross-sectional layers are formed into the completed fabricated component.

The delivery of build material 1070 and movement of the component 1050 in the vertical direction are relatively constant and only the movement of the laser beam 1062 is selectively controlled to provide a simpler and more precise implementation. The localized fusing of the build material 1070 enables more precise placement of fused material to reduce or eliminate the occurrence of over-deposition of material and excessive energy or heat, which may otherwise result in cracking or distortion. The unfused and fused build material 1070 may be reused, thereby further reducing scrap.

Any suitable laser and laser parameters may be used, including considerations with respect to power, laser beam spot size, and scanning velocity. According to exemplary embodiments, all these operations are performed in an environment substantially free of a reactive gas as previously described.

When the component is complete, it is removed from the additive manufacturing system (e.g., from the DMLF system 1000). The component may undergo finishing treatments. Finishing treatments may include, for example, aging, annealing, quenching, peening, polishing, hot isostatic pressing (HIP), or coatings.

While additive manufacturing processes for forming the component have been described, other powder consolidation processes may be used to form the component from the metal powder comprising the alloy containing the one or more extremely reactive elements. For example, the component may be formed by press and sinter, near-net shape hot-isostatic pressing, and metal injection molding (MIM) processes, and other powder consolidation processes that start with a metal powder (the powder build material) that is transformed into a solid three-dimensional article. For example, metal injection molding (MIM) is a powder consolidation process in which finely-powdered metal is mixed with a measured amount of a binder material to comprise a "feedstock" or the build material capable of being handled by plastic processing equipment through a known process known as injection mold forming. For purposes as described, exemplary binder material includes, for example, wax-based, thermo-plastics, or thermo-set polymers for compatibility with the high temperature alloy build material used in forming the component. While powder consolidation processes for forming the component have been described, it is to be understood that other fabrication techniques (e.g., casting, wrought/forging) may be used to fabricate the component from alloy forms other than metal powder. For example, the ingot alloy form may be used for casting and the billet ingot form may be used in wrought/forging processes. In addition, subtractive manufacturing powder consolidation processes may be used to form the component in accordance with exemplary embodiments. For example, subtractive manufacturing powder consolidation processes such as hot-isostatic pressing, extrusion, extrusion and subsequent forging, and other processes where subsequent material removal by, for example, machining to achieve tight dimensional control may be used. While particular alloy forms and fabrication techniques have been described, it is to be understood that other alloy forms and fabrication techniques will also benefit from the methods according to exemplary embodiments.

The component fabricated according to exemplary embodiments of the present invention contains the one or more extremely reactive elements in a beneficial alloyed form and in a controlled useful amount or level. The beneficial alloyed form of the one or more extremely reactive elements in the controlled useful amount or level confers benefits to the fabricated component. Such benefits include oxidation-resistance and/or sulfidation (hot corrosion) resistance or in some cases, unique magnetic properties as previously described.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

From the foregoing, it is to be appreciated that the methods for forming an alloy form comprising an alloy containing one or more extremely reactive elements and methods for fabricating a component therefrom in accordance with exemplary embodiments of the present invention enables the fabrication of a component from the alloy containing the one or more extremely reactive elements using additive manufacturing techniques and other powder consolidation methods as well as more conventional methods. The exemplary embodiments improve the retention of a controlled useful amount or level of the one or more extremely reactive elements in the beneficial alloyed form, conferring protective benefits (or in some cases, unique magnetic properties) to the fabricated component.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for fabricating, in a fabrication environment, a component from an alloy containing one or more extremely reactive elements, the method comprising:
    removing a reactive gas from the fabrication environment;
    forming an alloy form of the alloy comprising:
        pre-alloying the one or more reactive elements with one or more base elements to form a master alloy;
        forming a molten alloy by melting one or more base elements of the master alloy to produce a molten liquid and introducing the one or more extremely reactive elements into the molten liquid, the introducing of the one or more extremely reactive elements into the molten liquid comprises forming a sacrificial metal foam from the master alloy through which the molten liquid is poured; and
        shaping the molten alloy into the alloy form; and
    forming the component from the alloy form,
    wherein the one or more extremely reactive elements are introduced into the molten liquid just prior to the shaping step.

2. The method of claim 1, wherein the step of removing a reactive gas from the fabrication environment comprises using a chemical getter.

3. The method of claim 1, wherein the step of forming the alloy form comprises forming a metal powder.

4. The method of claim 3, wherein the step of forming the alloy form comprising the metal powder comprises at least one of:
    forming the metal powder comprising particles having at least one of a selected size distribution, size, or shape to reduce oxidation;
    forming the metal powder in a reducing atmosphere or in a vacuum atmosphere with a reducing gas;
    treating the metal powder with a treatment reducing gas; or
    applying a coating on the metal powder.

5. The method of claim 1, wherein the step of forming the component comprises using a powder consolidation process.

6. The method of claim 5, wherein the step of forming the component comprises homogenizing the one or more extremely reactive elements during the step of forming the component.

7. A method for forming, in a fabrication environment, a metal powder comprising an alloy containing one or more extremely reactive elements, the method comprising:
    removing a reactive gas from the fabrication environment;
    pre-alloying the one or more reactive elements with one or more base elements to form a master alloy;
    forming a molten alloy by melting a base element of the master alloy to produce a molten liquid and introducing the one or more extremely reactive elements into the molten liquid, the introducing of the one or more extremely reactive elements into the molten liquid comprises forming a sacrificial metal foam from the master alloy through which the molten liquid is poured;
    atomizing the molten alloy into the metal powder comprising particles having at least one of a selected size distribution, size, or shape; and wherein the metal powder is formed in a reducing atmosphere or in a vacuum atmosphere using a reducing gas, the metal powder to be used in a subsequent powder consolidation process.

8. The method of claim 7, further comprising the step of processing the metal powder prior to its use in the subsequent powder consolidation process, the processing step comprising at least one of:

treating the metal powder with a reducing gas; or
applying a coating on the metal powder.

9. The method of claim 7, wherein the step of removing a reactive gas from the fabrication environment comprises using a chemical getter.

10. The method of claim 7, wherein the step of forming the component comprises homogenizing the one or more extremely reactive elements during the subsequent powder consolidation process.

11. The method of claim 7, wherein the subsequent powder consolidation process comprises an additive manufacturing (AM) process, a press and sinter process, a powder forging process, a near-net shape hot isostatic pressing process, or a metal injection molding process.

* * * * *